United States Patent
Baik et al.

(10) Patent No.: US 10,133,555 B2
(45) Date of Patent: Nov. 20, 2018

(54) METHOD OF OPERATING RANDOM PULSE GENERATOR APPARATUS USING RADIOISOTOPE

(71) Applicant: EYL INC., Yongin-si (KR)

(72) Inventors: Jung Hyun Baik, Seongnam-si (KR); Seong Joon Cho, Seongnam-si (KR); Bu Suk Jeong, Yongin-si (KR); Dae Hyun Nam, Seoul (KR)

(73) Assignee: EYL INC., Gyeonggi-Do (KR)

( * ) Notice: Subject to any disclaimer, the term of this patent is extended or adjusted under 35 U.S.C. 154(b) by 0 days.

(21) Appl. No.: 15/649,026

(22) Filed: Jul. 13, 2017

(65) Prior Publication Data

US 2018/0067724 A1    Mar. 8, 2018

Related U.S. Application Data

(63) Continuation of application No. PCT/KR2017/003676, filed on Apr. 4, 2017.

(30) Foreign Application Priority Data

Sep. 8, 2016  (KR) .................... 10-2016-0115557

(51) Int. Cl.
  *G06F 7/58* (2006.01)
  *H04N 5/374* (2011.01)
  *G01T 1/00* (2006.01)
(52) U.S. Cl.
  CPC ............... *G06F 7/588* (2013.01); *G01T 1/00* (2013.01); *H04N 5/374* (2013.01)

(58) Field of Classification Search
  CPC ........... G06F 7/588; G01T 1/00; H04N 5/374
  See application file for complete search history.

(56) References Cited

U.S. PATENT DOCUMENTS

2017/0346626 A1* 11/2017 Baik .................... H04L 9/0852

FOREIGN PATENT DOCUMENTS

| JP | 11161473 | 6/1999 |
| KR | 101244853 | 3/2013 |
| KR | 101406299 | 6/2014 |
| KR | 20150011284 | 1/2015 |

\* cited by examiner

*Primary Examiner* — Tony Ko
(74) *Attorney, Agent, or Firm* — Cantor Colburn LLP

(57) ABSTRACT

Provided is an operating method of a random pulse generation apparatus using radioactive isotopes. An operating method of a random pulse generation apparatus using radioactive isotopes includes the steps of includes the steps of emitting alpha particles from a radioactive isotope emission unit, generating a pulse by repeating an operation in which when the alpha particles collide against a CMOS image sensor, the CMOS image sensor breaks down and a reverse current is generated, a first capacitor is connected to a ground and becomes a conduction state to generate a positive pulse, and if the alpha particles do not collide against the CMOS image sensor or the CMOS image sensor does not break down, the first capacitor is not conductive and an output value maintains a ground state, and amplifying the generated pulse by feedback impedance.

3 Claims, 3 Drawing Sheets

METHOD OF OPERATING RANDOM PULSE GENERATOR APPARATUS USING RADIOISOTOPE

TECHNICAL FIELD

The present invention relates to an operating method of a random pulse generation apparatus using a radioactive isotope and, more particularly, to a random pulse generation apparatus which generates a natural random number using a pulse generated when a CMOS image sensor becomes a breakdown region.

BACKGROUND ART

The Internet of Things (IoT), that is, a system in which things in life are connected over wired and wireless networks and information is exchanged, is generalized. The IoT is a thing space connection network over which intelligent relations, such as sensing, networking and information processing, are cooperatively formed without the explicit intervention of the human being with respect to three distributed environmental elements, such as the human being, things and services.

As the IoT is generalized, a security threat also increases. For IoT security, security not having disconnection for the entire section from an IoT device to a system is required. In particular, the IoT is exposed to a greater security threat because devices having various functions and protocols have to communicate with each other and thus an open type standard technology needs to be used.

Meanwhile, a software-based random number generation technology has a problem in that a random number generation pattern can be checked using an advanced hacking technology in addition to lots of resources.

Accordingly, a natural random number or a true random number extracted from the randomness of a natural phenomenon for security between IoT devices is requested. This has an advantage in that a specific pattern is not present and cannot be predicted, but has a problem in that it is difficult to apply to a small-sized device because the size is very large, such a method is very expensive and an extraction apparatus is required.

Related prior arts include Korean Patent Application Publication No. 10-2015-0011284 "Immobilizer apparatus using random pulse generation and authentication method thereof" and Korean Patent No. 10-1244853 "Integration authentication method for user using random pulse generation."

DISCLOSURE

Technical Problem

An object of the present invention is to provide an operating method of a random pulse generation apparatus which generates a natural random number when the alpha particles of a radioactive isotope collide against a CMOS image sensor.

Technical Solution

An operating method of a random pulse generation apparatus using a radioactive isotope according to an embodiment of the present invention includes the steps of emitting alpha particles from a radioactive isotope emission unit, generating a pulse by repeating an operation in which when the alpha particles collide against a CMOS image sensor, the CMOS image sensor breaks down and a reverse current is generated, a first capacitor is connected to a ground and becomes a conduction state to generate a positive pulse, and if the alpha particles do not collide against the CMOS image sensor or the CMOS image sensor does not break down, the first capacitor is not conductive and an output value maintains a ground state, and amplifying the generated pulse by feedback impedance.

Advantageous Effects

In accordance with the present invention, security between devices can be enhanced by generating a natural random number using a phenomenon in which a radioactive isotope naturally collapses and applying a random signal to a required device.

In accordance with the present invention, the security and lightweightness of an IoT device can be improved because the size of the random pulse generation apparatus can be implemented in a smaller and thinner thin film form.

MODE FOR INVENTION

Figure 1:
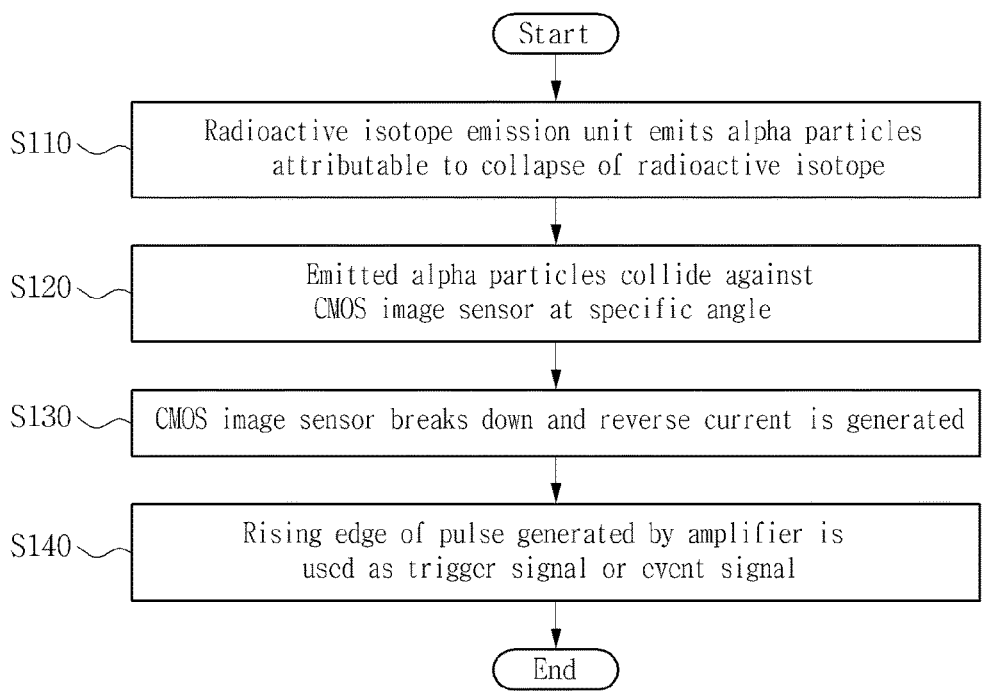
FIG. 1 is a flowchart for illustrating an operating method of a random pulse generation apparatus using isotopes according to an embodiment of the present invention.

A specific structural or functional description of embodiments according to the concept of the present invention this specification has been merely illustrated for the purpose of describing the embodiments according to the concept of the present invention, and the embodiments according to the concept of the present invention may be implemented in various forms and are not limited to embodiments described in this specification.

The embodiments according to the concept of the present invention may be changed in various ways and may have various forms, and thus the embodiments are illustrated in the drawings and described in detail in this specification. However, this is not intended to limit the embodiments according to the concept of the present invention to specific disclosed forms and includes all of changes, equivalents or substitutes included in the spirit and technical scope of the present invention.

The terms used in this application are used to only describe specific embodiments and are not intended to restrict the present invention. An expression of the singular number includes an expression of the plural number unless clearly defined otherwise in the context. In this specification, terms, such as "include" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

Hereinafter, the embodiments of the present invention are described in detail with reference to the drawings attached to this specification.

FIG. 1 is a flowchart for illustrating an operating method of a random pulse generation apparatus using isotopes according to an embodiment of the present invention.

Referring to FIG. 1, in the operating method of the random pulse generation apparatus using a radioactive isotope, first, a radioactive isotope emission unit emits alpha particles generated when a radioactive isotope collapses (S110). The radioactive isotope emission unit may be disposed to face a CMOS image sensor or may be directly disposed on the CMOS image sensor and drop on the CMOS image sensor in a liquefied form. The alpha particles may be $Am^{241}$ that naturally collapses, but is not limited thereto. For example, the alpha particles may be at least one of $Pb^{210}$ isotope that is a uranium emission, $Cm^{244}$ and $Po^{210}$.

Thereafter, the emitted alpha particles collide against the CMOS image sensor at a specific angle (S120). At this time, the alpha particles may collide against the CMOS image sensor at a specific angle. For example, the alpha particles may be emitted at an angle of 90 degrees and collide against the CMOS image sensor.

Thereafter, the CMOS image sensor becomes a breakdown region due to the collision between the CMOS image sensor and the alpha particles, thereby generating a reverse current (S130). When the alpha particles collide against the CMOS image sensor, the CMOS image sensor becomes the breakdown region, the reverse current flows, and thus a positive value is output to an amplifier. That is, while the alpha particles repeatedly collide against the CMOS image sensor, a random pulse may be generated. If the alpha particles do not collide against the CMOS image sensor, output of the amplifier maintains a ground state.

Thereafter, the rising edge of the pulse generated by the amplifier is used as a trigger signal or an event signal (S140). That is, the steps are repeated to generate the pulse, and a natural random number may be generated through the interval between pulses based on the emission time of the alpha particles.

Figure 2:
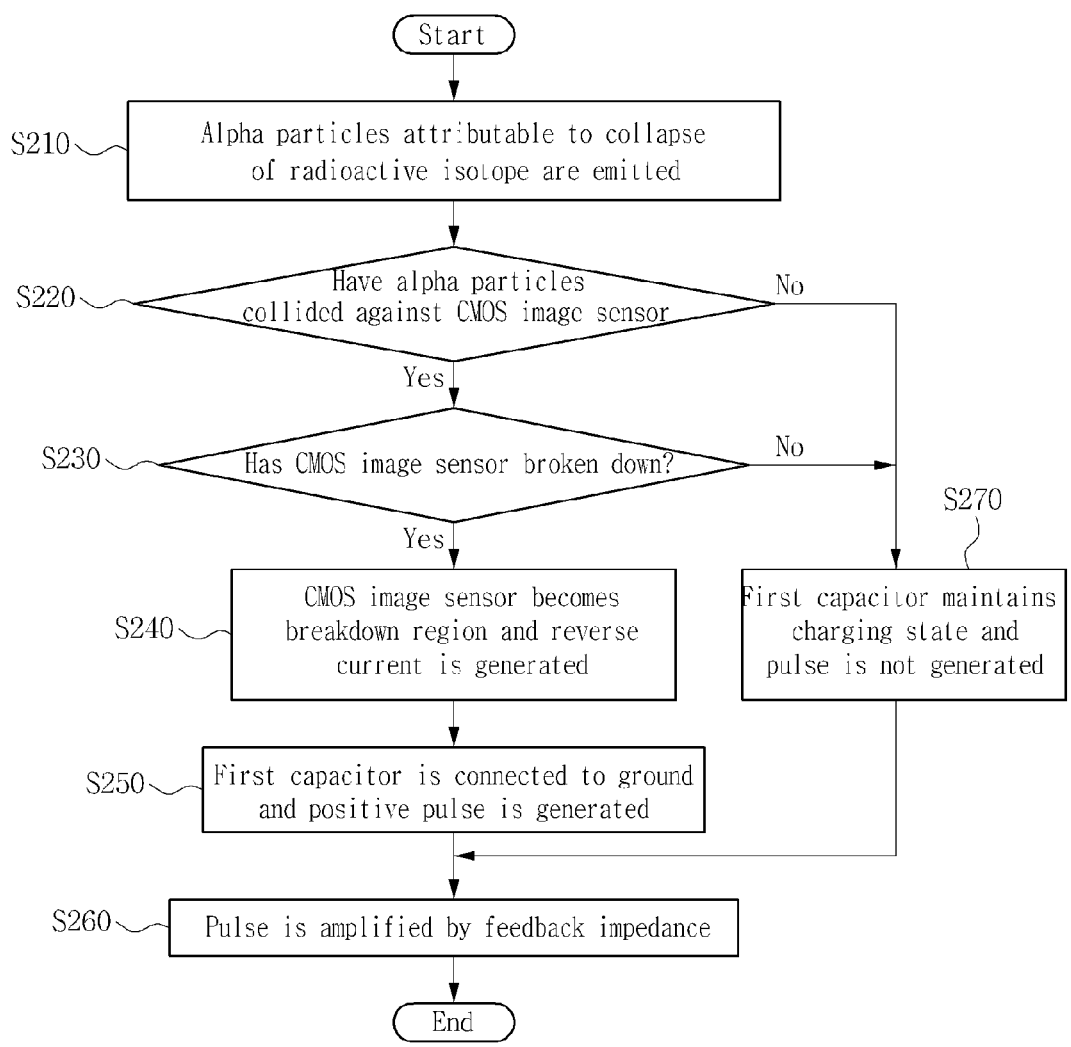
FIG. 2 is a flowchart for illustrating an operating method of the random pulse generation apparatus using isotopes according to another embodiment of the present invention.

FIG. 2 is a flowchart for illustrating an operating method of the random pulse generation apparatus using isotopes according to another embodiment of the present invention.

Referring to FIG. 2, first, alpha particles attributable to the collapse of a radioactive isotope are emitted (S210). The alpha particles may be $Am^{241}$ that naturally collapses, but is not limited thereto. For example, the alpha particles may be at least one of $Pb^{210}$ isotope that is a uranium emission, $Cm^{244}$ and $Po^{210}$.

Thereafter, the alpha particles collide against the CMOS image sensor (S220). When the CMOS image sensor breaks down (S230), the CMOS image sensor becomes a breakdown region, thereby generating a reverse current (S240). A first capacitor is connected to the ground, a positive value is output to an amplifier, and thus a positive pulse is generated (S250).

If the alpha particles do not collide against the CMOS image sensor or the CMOS image sensor does not break down (S220, S230), the first capacitor becomes a charging state, so a pulse is not generated (S270).

Thereafter, the generated pulse is amplified by feedback impedance (S260). The alpha particles may be emitted at an angle of 90 degrees. In some embodiments, the alpha particles may collide against the CMOS image sensor, and thus the amplitude of a positive pulse that has been generated may be constant.

That is, the steps are repeated to generate a pulse, and a natural random number may be generated through an interval between the pulses based on the emission time of the alpha particles.

Figure 3:
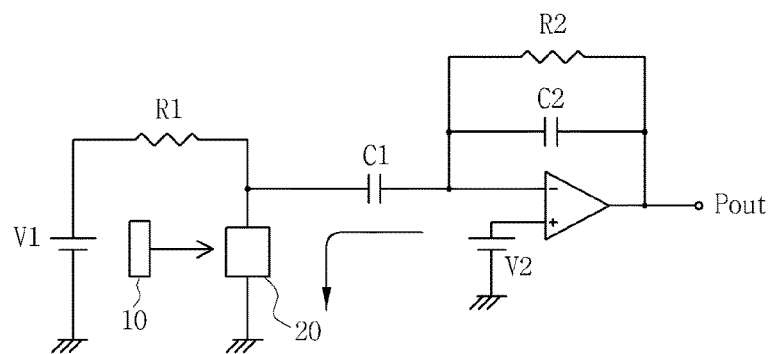
FIG. 3 is a circuit diagram showing the random pulse generation apparatus according to an embodiment of the present invention.

FIG. 3 is a circuit diagram showing the random pulse generation apparatus according to an embodiment of the present invention.

Referring to FIG. 3, the random pulse generation apparatus includes a CMOS image sensor 20 which receives alpha particles from a radioactive isotope emission unit 10, a first resistor R1, a second resistor R2, a first capacitor C1, a second capacitor C2 and an amplifier. In this case, the radioactive isotope emission unit 10 may be disposed to face the CMOS image sensor 20 or may drop on the CMOS image sensor 20 in a liquefied form. The CMOS image sensor 20 includes a pixel array unit in which photodiodes each including a detection unit for detecting alpha particles have been arrayed in a matrix form. If the radioactive isotope emission unit 10 drops on the CMOS image sensor 20 in a liquefied form, it may be directly disposed on the detection units. Before the alpha particles collide against the CMOS image sensor 20, output of the amplifier maintains a ground state because the first capacitor C1 maintains a charging state due to power.

When the alpha particles collide against the CMOS image sensor 20, the CMOS image sensor 20 becomes a breakdown region, a reverse current flows, and thus the ground is connected to the first capacitor C1. That is, an electric current flows from a cathode to an anode, thereby generating a reverse current. When the alpha particles collide against the CMOS image sensor 20, electric charges charged in the first capacitor C1 exit to the ground and thus a level becomes 0. Accordingly, a positive value is output to the amplifier. That is, as the alpha particles repeatedly collide against the CMOS image sensor 20, a random pulse may be generated.

The second resistor R2 and the second capacitor C2 may operate as feedback impedance and control an amplification value.

Figure 4:
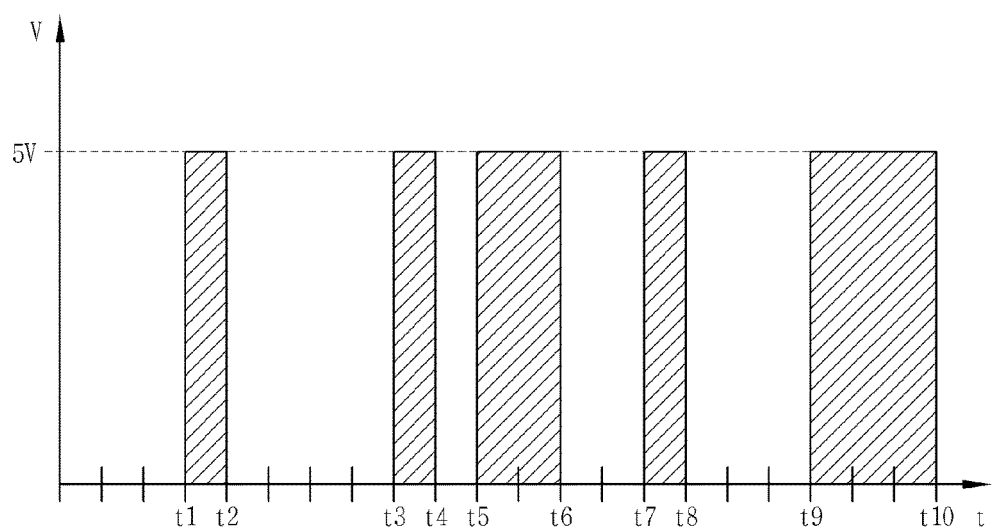
FIG. 4 is a diagram showing pulse output according to an embodiment of the present invention.

FIG. 4 is a diagram showing pulse output according to an embodiment of the present invention.

Referring to FIG. 4, pulses having the same amplitude may be output in sections t1-t2, t3-t4, t5-t6, t7-t8 and t9-t10 in which alpha particles collide according to an embodiment. Output may be 0 in sections t2-t3, t4-t5, t6-t7 and t8-t9 I which the alpha particles do not collide or the CMOS image sensor does not break down. The pulse may have a square wave form, but is not limited thereto. The sections t2-t3, t4-t5, t6-t7 and t8-t9 in which the alpha particles do not collide are counted, and thus a random pulse may be generated. That is, the random pulse may be generated in accordance with the emission time of the alpha particles.

Although the embodiments of the present invention have been described with reference to the accompanying drawings, they are only illustrative. A person having ordinary skill in the art will understand that the present invention may be modified in various ways and that other equivalent embodiments of the present invention are possible. Accordingly, the true range of protection of the present invention should be determined by the following claims.

The invention claimed is:

1. An operating method of a random pulse generation apparatus using a radioactive isotope, the method comprising steps of:
   (a) emitting alpha particles from a radioactive isotope emission unit;
   (b) generating a pulse by repeating an operation in which when the alpha particles collide against a CMOS image sensor, the CMOS image sensor breaks down and a reverse current is generated, a first capacitor is connected to a ground and becomes a conduction state to generate a positive pulse, and if the alpha particles do not collide against the CMOS image sensor or the CMOS image sensor does not break down, the first capacitor is not conductive and an output value maintains a ground state; and (c) amplifying the generated pulse by feedback impedance.

2. The method of claim 1, wherein in the step (a), the alpha particles are emitted at an angle of 90 degrees or drops to the CMOS image sensor in a liquefied form.

3. The method of claim 1, wherein in the step (b), an amplitude of the pulse generated when power is applied to the first capacitor is constant.

* * * * *